May 20, 1952 A. R. McKINSTRY 2,597,017
PORTABLE POWER SAW FOR CUTTING TIMBER OR THE LIKE
Filed May 9, 1949 3 Sheets-Sheet 1
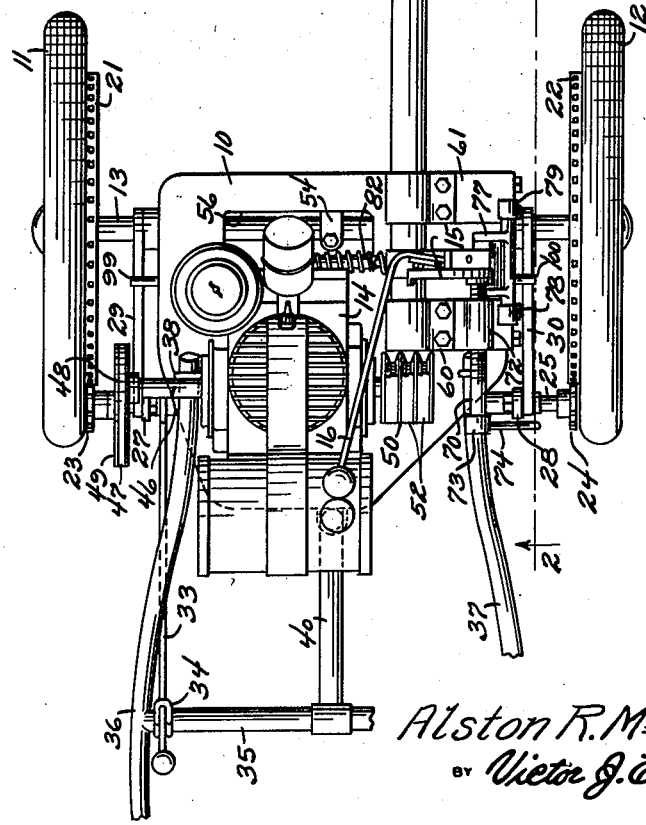
INVENTOR.
Alston R. McKinstry
BY Victor J. Evans & Co.
ATTORNEYS May 20, 1952  A. R. McKINSTRY  2,597,017
PORTABLE POWER SAW FOR CUTTING TIMBER OR THE LIKE
Filed May 9, 1949  3 Sheets-Sheet 2
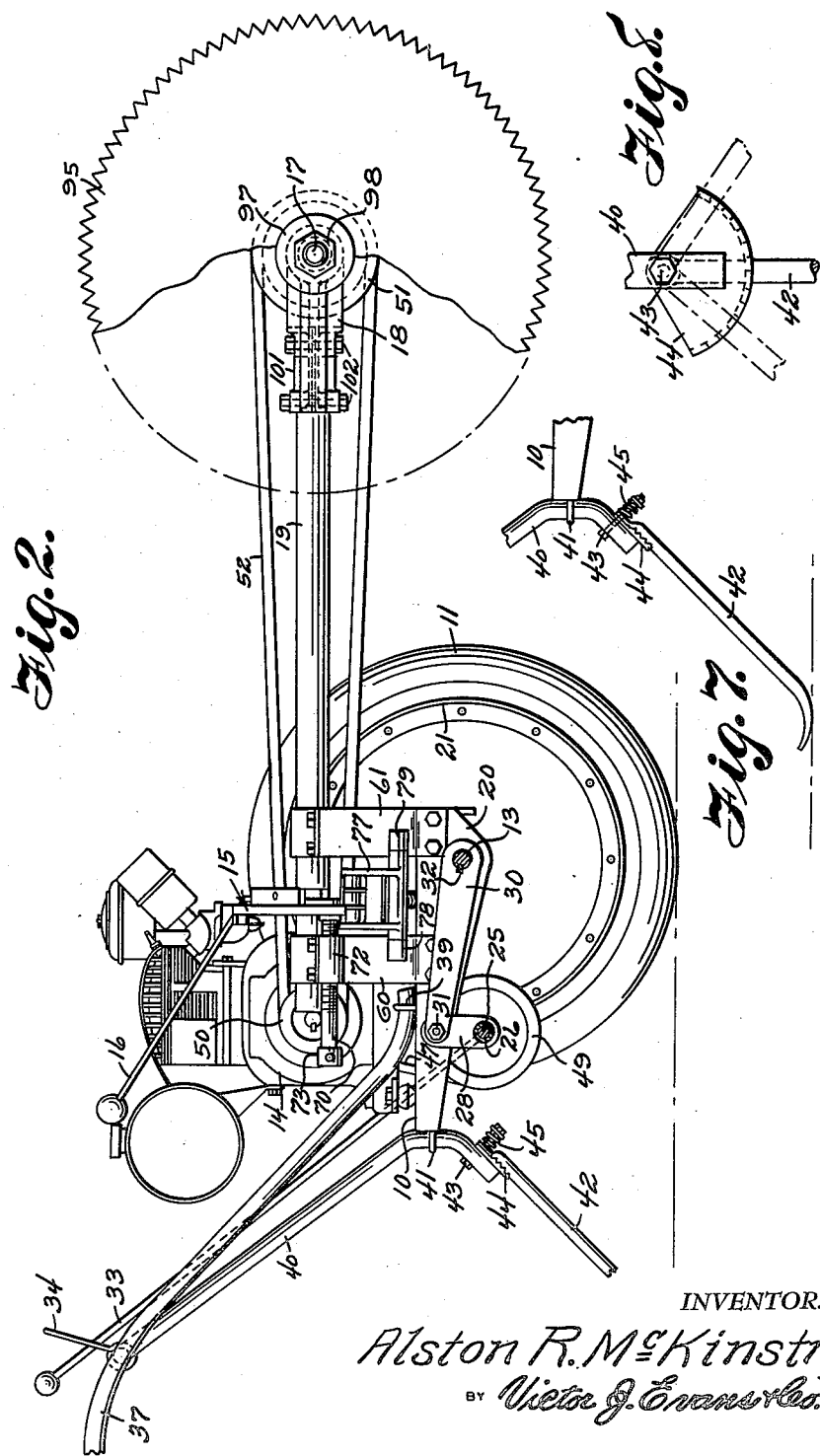
INVENTOR.
Alston R. McKinstry
BY Victor J. Evans & Co.
ATTORNEYS May 20, 1952 A. R. McKINSTRY 2,597,017
PORTABLE POWER SAW FOR CUTTING TIMBER OR THE LIKE
Filed May 9, 1949 3 Sheets-Sheet 3
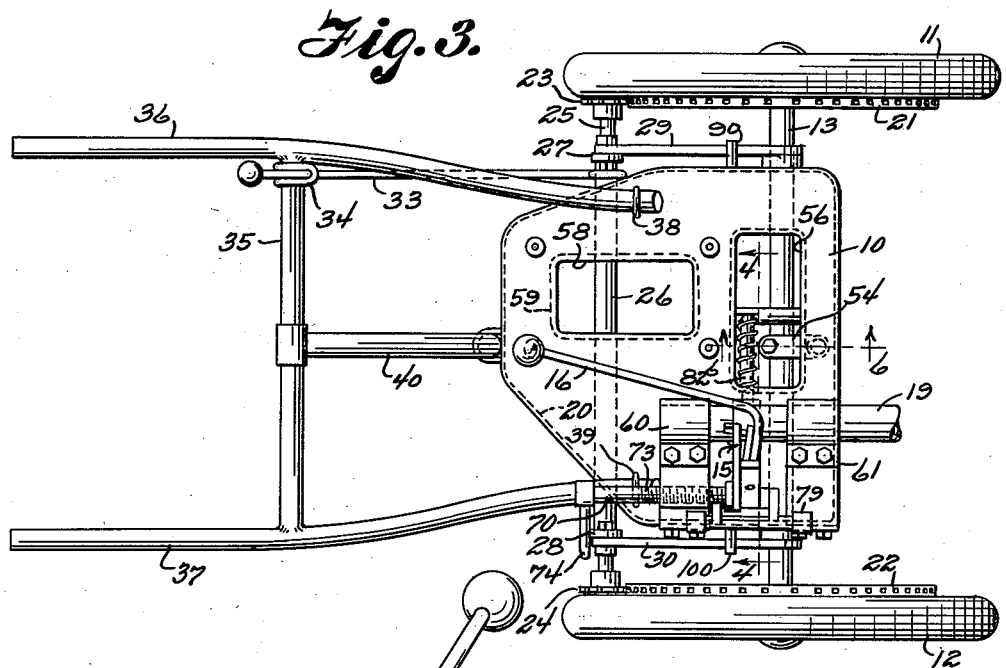
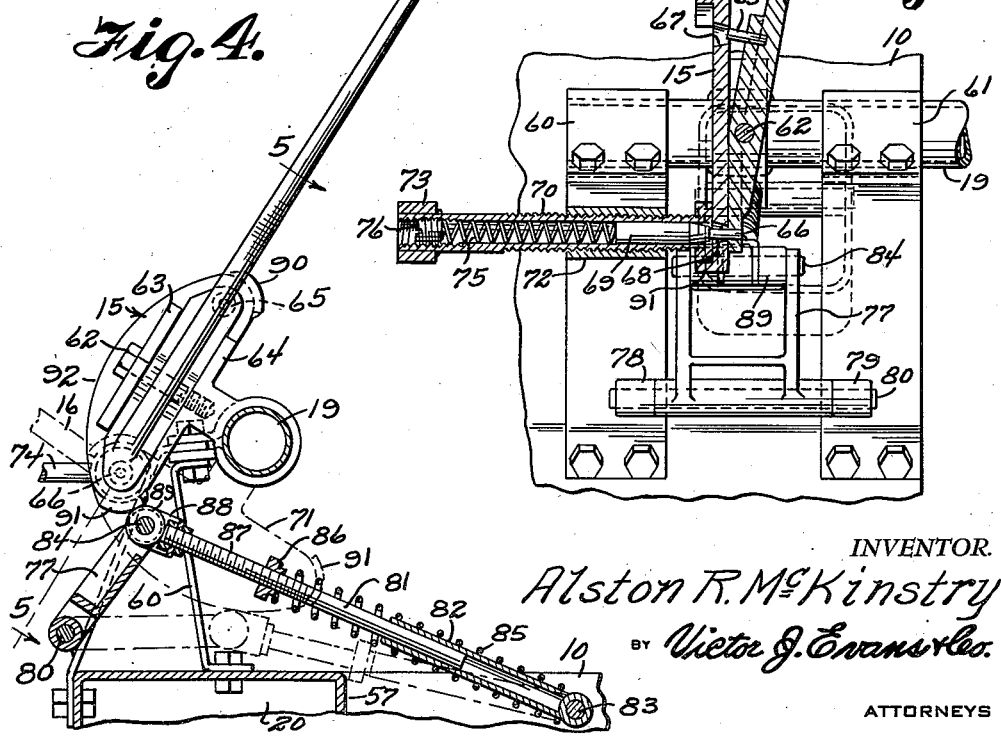
INVENTOR.
Alston R. McKinstry
BY Victor J. Evans & Co.
ATTORNEYS Patented May 20, 1952

2,597,017

UNITED STATES PATENT OFFICE 2,597,017

PORTABLE POWER SAW FOR CUTTING TIMBER OR THE LIKE

Alston R. McKinstry, Brunswick, Ga., assignor to Kut-Kwick Tool Corporation, Brunswick, Ga.

Application May 9, 1949, Serial No. 92,131

7 Claims. (Cl. 143—43)

This invention relates to portable power units wherein a motor or engine is mounted on a pair of traction wheels and provided with means for actuating a power saw, post hole auger, or other implements or devices, and in particular a carriage mounted on wheels and carrying an engine with a shaft carrying a circle saw on the outer end extended from the carriage and in which means is provided in the carriage for turning the saw through an angle of 90° whereby the saw is mounted for use in both horizontal and vertical positions.

The purpose of this invention is to provide a portable power unit for operating a saw in the field, which may also be used for other devices, and in which the saw or tool carrying arbor, which is suspended from the unit is operatively adjustable for use in horizontal and vertical positions.

The usual type of power saw is built to operate with the saw in a vertical position and is generally used for cutting timber with the timber in a horizontal position on the ground and when it is desired to use a power saw for cutting trees it is necessary to provide special units, or when adjusting means is provided in a unit the unit is too cumbersome for use in the woods. With this thought in mind this invention contemplates a power unit having a saw carried on the outer end of a shaft extended from the unit in which the unit includes means for turning the shaft through an angle of 90° and in which the driving means includes belts which operate in either position.

The object of this invention is, therefore, to provide means for constructing a power unit for field use in which a saw or other tool carried thereby is adjustable for operation in either a horizontal or vertical position.

Another object of the invention is to provide a power unit having a tool carrying arbor suspended therefrom by a shaft in which the shaft is rotated to turn the arbor through an angle of 90° by a hand lever extended from the unit.

A further object of the invention is to provide a power unit for circle saws and other tools in which means is provided for turning a saw or tool carrying arbor through an angle of 90°, which is of a comparatively simple and economical construction.

With these and other objects and advantages in view the invention embodies a carriage including a horizontally disposed base plate mounted through an axle on two traction wheels with the motor mounted on the base plate, an arbor carried in the outer end of a shaft suspended from the base plate, means for driving the traction wheels from the motor when it is desired, means for driving a saw or tool carrying arbor, and means for turning the shaft to adjust the position of the said arbor.

Other features and advantages of the invention will appear from the following description taken in connection with the drawings wherein:

Figure 1 is a plan view of the power unit showing a saw operatively mounted thereon and in which parts of the handles are broken away.

Figure 2 is a side elevational view of the unit taken on line 2—2 of Figure 1 with parts of the handles and also part of the saw broken away.

Figure 3 is a plan view of the unit with the motor omitted and with the saw carrying shaft broken away.

Figure 4 is a detail illustrating the operation of the shifting elements of the power unit and taken on line 4—4 of Figure 3.

Figure 5 is a detail showing a sectional view taken on line 5—5 of Figure 4.

Figure 6 is a section through the base plate being taken on line 6—6 of Figure 3.

Figure 7 is a detail illustrating a supporting shoe for holding the carriage with the saw in the operative position.

Figure 8 is a detail illustrating the shoe mounting whereby the shoe may be adjusted to different positions.

Referring now to the drawings wherein like reference characters denote corresponding parts the portable power unit of this invention includes a base plate 10 mounted on traction wheels 11 and 12 through an axle 13, a motor or engine 14, an index plate 15 actuated by a hand lever 16, and a tool carrying arbor 17 rotatably mounted in a yoke 18 at the outer end of a tubular shaft 19.

The base plate 10 is provided with a continuous downwardly extended flange 20 in which the axle 13 is fixedly mounted. The wheels 11 and 12 are rotatably mounted on the axle and the wheels are provided with perforated rings 21 and 22 that mesh with sprockets 23 and 24 respectively, the sprockets being mounted on a shaft 25 that is journaled in a sleeve 26 in the ends of links 27 and 28 which are pivotally mounted in the outer ends of arms 29 and 30, respectively, by bolts 31, the arms being fixedly mounted on the axle 13 by keys 32. In the position shown in Figures 2 and 3 the sprockets 23 and 24 mesh with the perforated rings 21 and 22 and when it is desired to release the sprockets from the rings the shaft 25 is drawn upwardly by a shift rod 33, the upper end of which extends through a yoke 34 on a cross bar 35 positioned between the handles 36 and 37. The lower ends of the handles are secured to the base plate 10 by fasteners 38 and 39, and the cross bar 35 is also supported by a strut 40 that is attached to the base plate by a fastener 41. The lower end of the strut 40 extends diagonally as shown in Figure 2 and a supporting shoe 42 is pivotally mounted thereon by a bolt 43, and as illustrated in Figures 7 and 8. A toothed segment 44 is provided on the lower end of the strut whereby with the shoe 42 resiliently held between the teeth thereof by a spring 45 the shoe 42 may be adjusted to different positions as illustrated in Figure 8.

The shaft 25 is driven from the motor shaft 46 by a belt 47 trained over a pulley 48 on the motor shaft and the pulley 49 on the shaft 45. The motor shaft 46 is also provided with pulleys 50 that are aligned with corresponding pulleys 51 on the tool arbor 17 and belts 52 are trained over these pulleys as illustrated in Figure 2.

The intermediate part of the base plate 10 is resiliently supported from the axle 13 by a spring 53 which is mounted on a bracket 54 that is clamped on the axle by a bolt 55, as illustrated in Figure 6. The base plate is provided with an opening 56 having a depending flange 57 and also an opening 58 having a depending flange 59.

The tubular shaft 19 is mounted on the base plate 10 through bearing brackets 60 and 61, and the indexing plate 15, which is formed as illustrated in Figure 4 is fixedly mounted, preferably by welding on the shaft. The lever 16 is pivotally mounted on a bolt 62 between flanges 63 and 64 of the index plate and this lever is provided with pins 65 and 66 that are positioned to extend into openings 67 and 68, respectively in the index plate, as shown in Figure 5. A locking pin 69 having a tapered end is mounted in a tube 70 and positioned whereby the said tapered end extends into one of the openings 67 or 68 of the index plate to lock the index plate in the position shown in full lines in Figure 4 or in the position shown by the dot and dash lines 71. The tube 70 is threaded in a socket 72 of the bracket 60 and the outer end is provided with a collar 73 having a handle 74 extended therefrom, by which it may be rotated to adjust the position thereof. A spring 75 is held in the tube by a threaded plug 76 which holds the spring against the pin 69, thereby resiliently urging the tapered end of the pin into the opening of the index plate.

When it is desired to change the position of the saw or other tool on the arbor 17 the lever 16 is actuated whereby one of the pins 65 or 66 forces the pin 69 out of the opening, as shown in Figure 5, whereby the index plate is free to turn, and being secured to the shaft 19, the shaft turns therewith.

In order to frictionally retain the index plate and shaft in adjusted position a toggle is provided which is formed with a bracket 77 that is pivotally mounted in bearings 78 and 79 on the bearing brackets 60 and 61, respectively, by a pin 80, and a telescoping element formed by a rod 81 in a tube 82 with the tube pivotally mounted on a pin 83 in the base plate 10 and with the rod 82 pivotally connected to the brackets 77 by a pin 84. A spring 85 is provided on the rod 81 and the tube 82 and the tension of the spring is adjusted by a nut 86 on the threaded end 87 of the rod 81. The end 87 of the rod is threaded into a socket 88 through which the rod is mounted on the pin 84. The pin 84 is provided with a roller 89 that engages arcuate shoes 90 and 91 on the ends of the index plate and also the arcuate edge 92 of the plate. It will be noted in Figure 4 that as the index plate and shaft 19 are turned the toggle elements will be forced downwardly to the position shown in dot and dash lines whereby force will be constantly applied to the index plate for securing it in adjusted positions.

The yoke 18 is removably mounted on the outer end of the tubular shaft 19 and the arbor 17 is journaled in bearings 93 and 94 thereof, as illustrated in Figure 1. The pulleys 50 and 51 are positioned on the center of the supporting shaft 19 so that the load is directly taken thereby, with the belts of the pulleys straddling the said shaft. A saw 95 or other tool, may be clamped between collars 96 and 97 on the end of the arbor by a nut 98.

With the parts arranged in this manner a saw or other tool carried on the outer end of the shaft 19 may be wheeled to a tree or log with the carriage driven through the wheels 11 and 12 by the sprockets 23 and 24 and when the power unit is in position the sprockets 23 and 24 are disengaged from the rings 21 and 22 by the shift lever 33, the arms 29 and 30 being retained by stops 99 and 100 shown in Figures 1 and 3, and with the unit resting on the shoe 42 the saw is rotated to cut the tree or log. With the index plate and lever 16 the position of the saw is readily adjustable from the vertical position illustrated to a horizontal position whereby it may be used for cutting trees or the like.

The sleeve 70 which is turned by the handle 74 bears against the surface of the index plate and provides a belt tightener for taking up wear or slack in the belts.

The yoke 18 is provided with a split hub 101 and the hub is secured in clamping relation with the shaft 19 by bolts 102, whereby the yoke may readily be removed and replaced by another yoke or by a mounting device for holding a tool or the like on the end of the shaft.

It will be understood that modifications may be made in the design and arrangement of the parts without departing from the spirit of the invention.

What is claimed is:

1. A portable power unit comprising a carriage mounted on wheels, a motor mounted on said carriage, a tool carrying shaft extended from said carriage, tool mounting means on the outer end of said shaft, means driving a tool in the mounting means from the carriage, means turning the shaft and tool mounting means through an angle of 90°, means locking the tool mounting means in adjusted positions, and spring actuated toggle levers pivotally mounted on the carriage for frictionally holding the said tool mounting means in adjusted positions.

2. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, and means driving the arbor from the engine.

3. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, and means driving the arbor from the engine.

4. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, means driving the wheels of the units by the engine, and means driving the arbor from the engine.

5. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, a spring actuated toggle mounted on the base plate and engaging said index plate for resiliently holding the said index plate and shaft, and means driving the arbor from the engine.

6. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, means driving the arbor from the engine, and a downwardly extended shoe adjustably mounted on the unit for supporting the unit in operative position.

7. In a portable power unit, the combination which comprises a base plate mounted on wheels, an engine carried by said base plate, handles extended from said base plate, a forwardly extended shaft mounted for turning movement on said base plate, a tool holding arbor carried by the outer end of said shaft, means removably mounting the tool holding arbor on the outer end of the shaft, an index plate having spaced openings therein mounted on the shaft and positioned on the said base plate, a spring actuated pin positioned to engage the said openings of the index plate for securing the shaft and tool holding arbor in adjusted positions, a lever pivotally mounted on said index plate and having means thereon for forcing the said spring actuated pins out of the openings of the index plate for turning the said shaft and arbor, and means driving the arbor from the engine.

ALSTON R. McKINSTRY.

REFERENCES CITED

The following references are of record in the file of this patent:

UNITED STATES PATENTS

| Number | Name | Date |
| --- | --- | --- |
| 2,461,188 | Stoner | Feb. 8, 1949 |
| 2,463,232 | Zimicki | Mar. 1, 1949 |
| 2,480,893 | Whittle | Sept. 6, 1949 |
| 2,497,639 | Underwood | Feb. 14, 1950 |